Patented Sept. 29, 1942

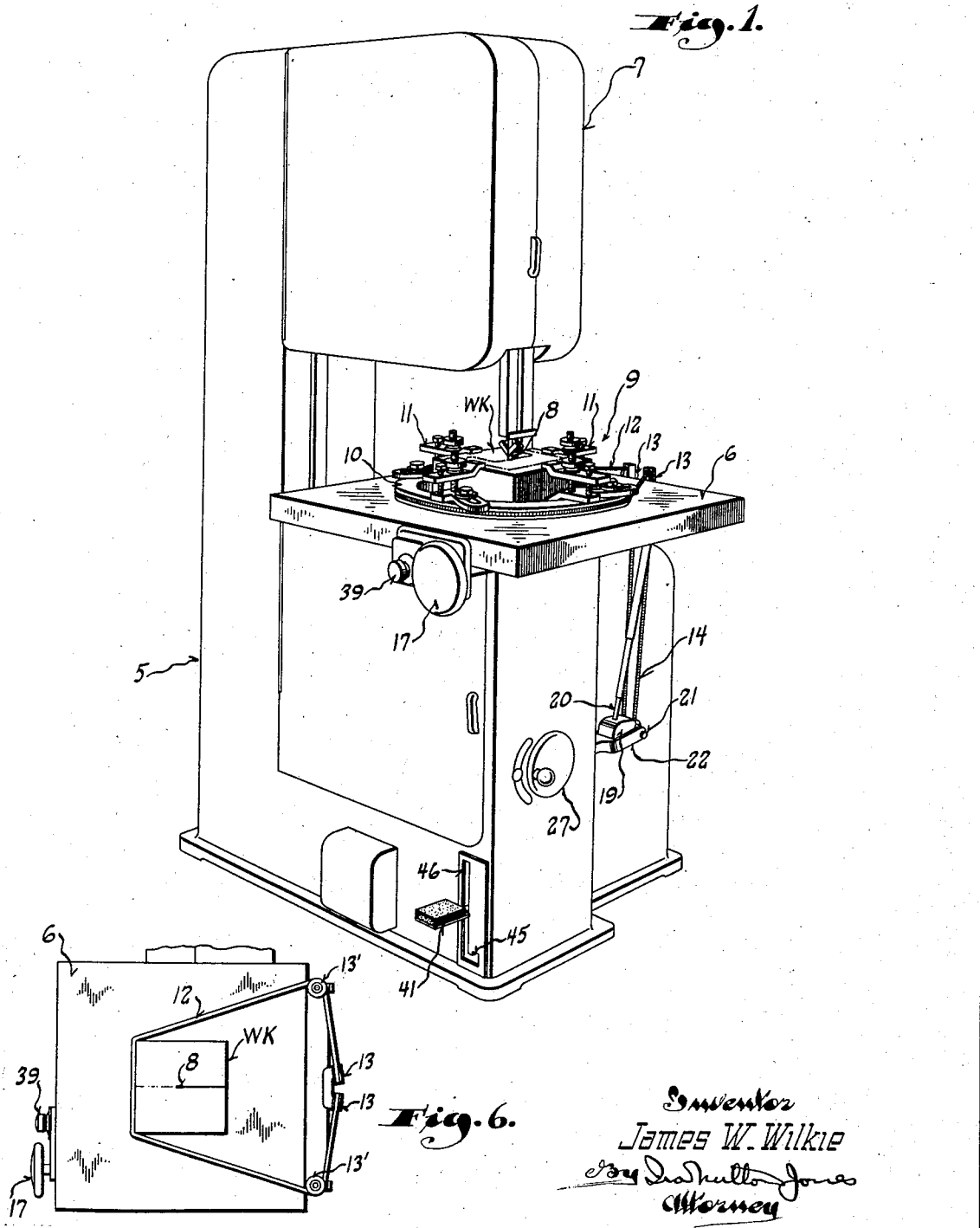

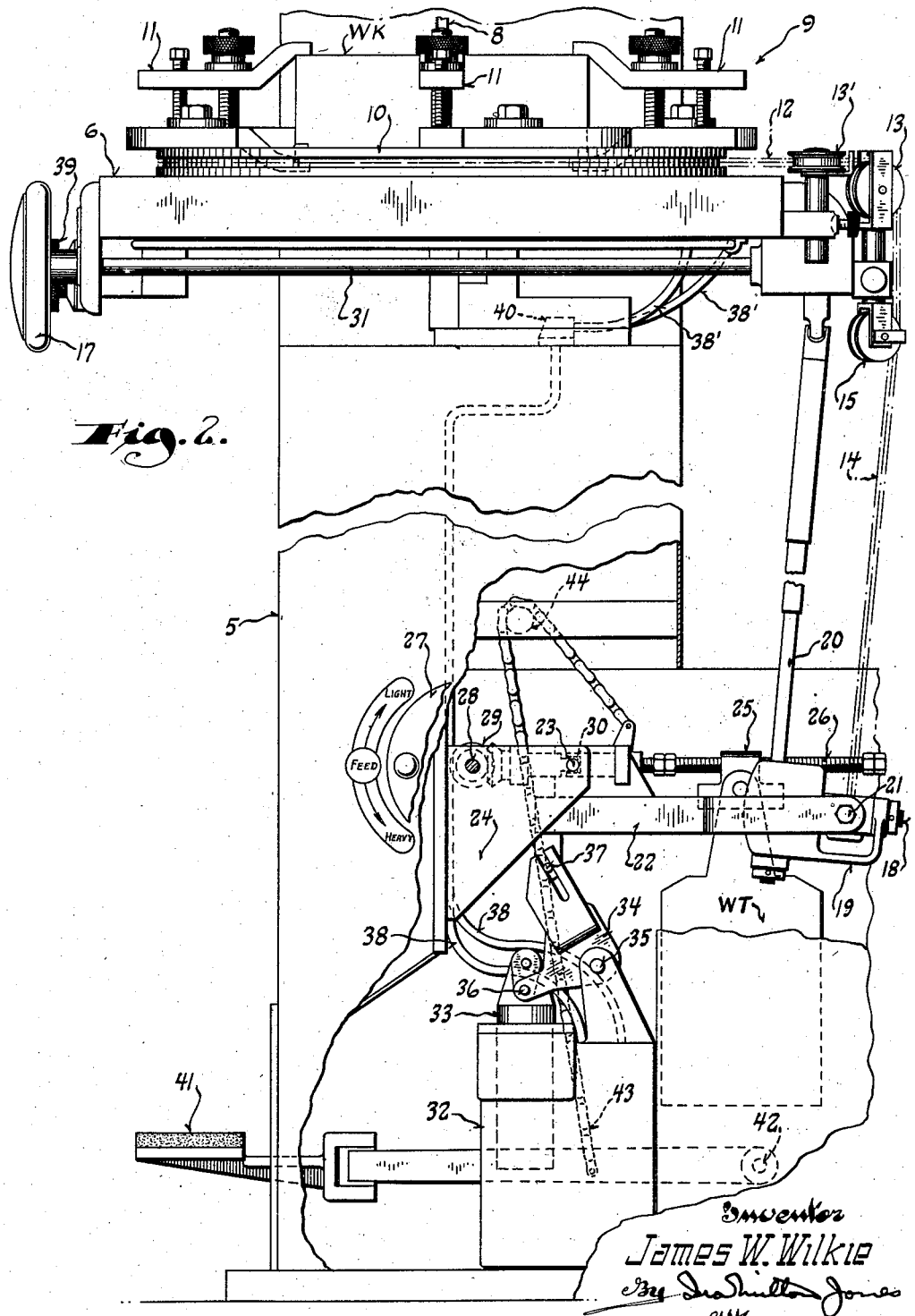

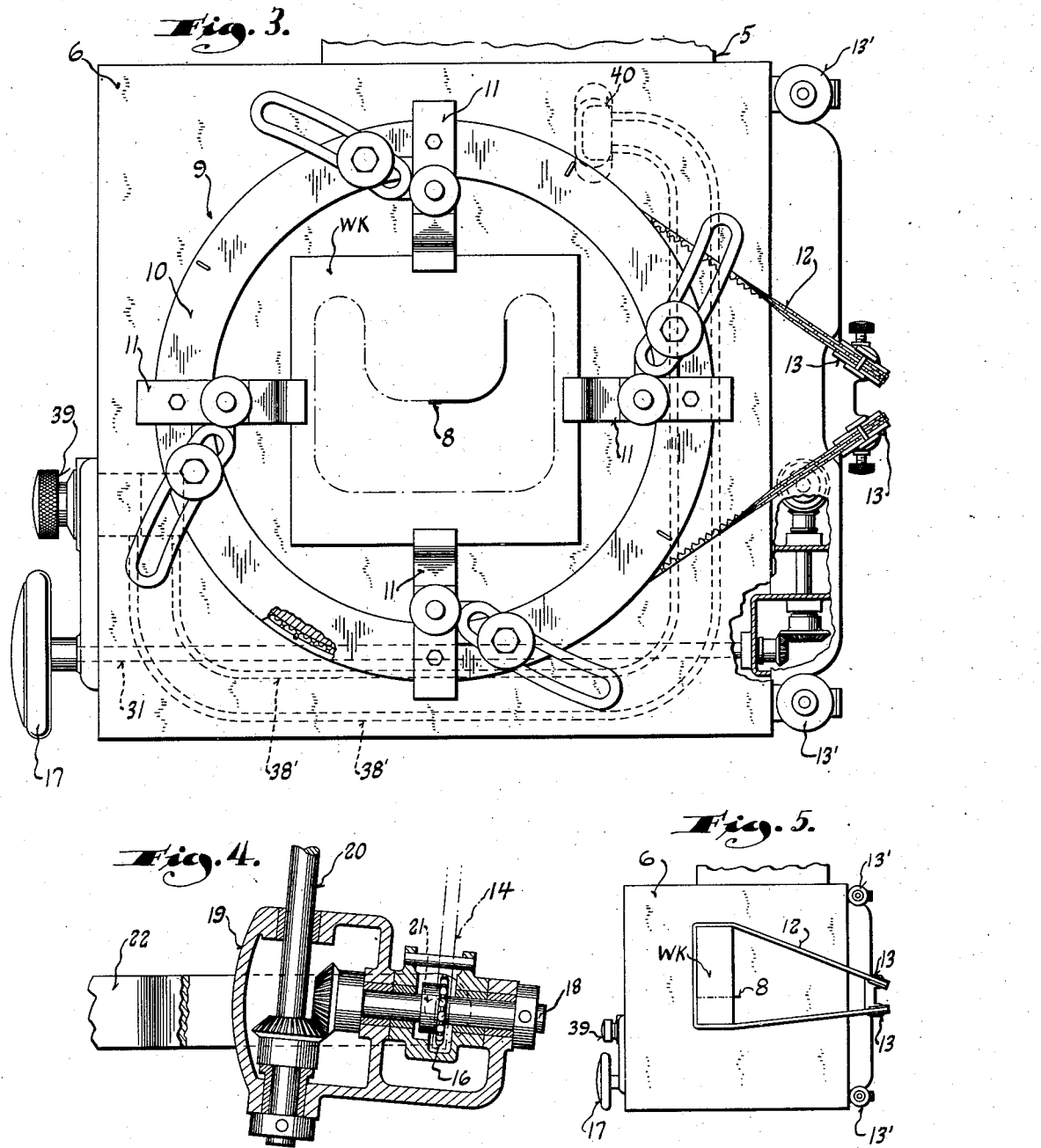

2,296,967

UNITED STATES PATENT OFFICE 2,296,967

CONTOUR SAWING MACHINE

James W. Wilkie, Minneapolis, Minn., assignor to Continental Machines, Inc., Minneapolis, Minn., a corporation of Minnesota Application October 21, 1940, Serial No. 362,040

16 Claims. (Cl. 29—68)

This invention relates to machine tools and refers particularly to machines known in the art as contour sawing machines, which are very much similar to the conventional band saw.

These machines comprise a base or pedestal portion, a tiltably mounted work supporting table and a pair of pulleys, one above and the other beneath the table, over which an endless flexible band saw is trained to travel downwardly in a straight line path through a working zone above the table.

In view of the relatively great pressure required to feed the work to the saw, difficulty has been experienced in the past in this respect, particularly where the contour of the cut to be made necessitated navigating curves requiring both a feeding presssure and a guiding pressure.

It is, therefore, an object of the present invention to provide a novel work feeding mechanism for machines of this type, which not only is capable of exerting continuous uniform feeding pressure on the work but also provides for convenient manual control of the position of the work with relation to the cutting tool.

More specifically, it is an object of this invention to provide means for imparting a continuous uniform feeding pressure or force which acts to draw the work across the table and against the tool, together with means for rotating the work about the tool to guide the cutting action along a given contour line.

Another object of this invention resides in the provision of manually controllable means for regulating the feeding presssure and also for regulating the rate of feed.

In this connection it is a further object of this invention to provide hydraulic control means for regulating the rate of feed, controllable by means of a manually operated by-pass valve conveniently located at the front of the work table.

With a view toward facilitating manipulation of the machine, this invention has as another of its objects the provision of a handle located at the front of the work table which, through suitable driving connections, imparts the guiding or turning force on the work to swing it about the tool in one direction or the other as the handle is turned one way or the other.

It is also an object of this invention to provide means for imparting the feeding and guiding force to the work without interfering with the tiltability of the table.

Another object of this invention resides in the provision of a weight so connected with the work or a work holding fixture as to impart a work feeding motion thereto with a force dependent upon the adjustment of the weight and at a speed governed by the manually controlled by-pass valve of a hydraulic dash pot.

Still another object of this invention resides in the provision of a simple treadle action for restoring the weight to its potentially operative position to thereby enable readjustment of the work for the beginning of another stroke.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate two complete examples of the physical embodiment of the invention, constructed in accordance with the best modes so far devised for the practical application of the principles thereof, and in which:

Figure 1 is a perspective view of a machine embodying this invention;

Figure 2 is an enlarged view partially in side elevation and partly broken away and in section illustrating the base portion of the machine;

Figure 3 is a plan view of the work supporting table with the saw in section and illustrating a piece of work in position;

Figure 4 is a cross-sectional view illustrating a detail of the work guiding means; and Figures 5 and 6 are plan views of the work supporting table illustrating slightly modified applications of this invention.

Referring now more particularly to the accompanying drawings, in which like numerals indicate like parts, the numeral 5 designates the frame of the machine which consists of the usual base upon which a table 6 is tiltably mounted and an overhanging pedestal portion 7. Suitable pulleys (not shown) are journalled in the base and the pedestal portion 7 to mount an endless flexible saw 8. Driving mechanism (not shown) drives the pulleys to cause the endless saw to traverse the working zone above the table 6 downwardly in a straight line path.

Inasmuch as the general structure of the machine including the manner in which the table is tiltably mounted, forms no part of this invention, it has not been illustrated.

For small relatively light work it is sufficient to feed the work manually against the saw blade, but for heavier work requiring greater feeding pressure, mechanical feeding mechanism must be provided. This is the basic purpose of the present invention.

The mechanism employed comprises a work holding device or fixture indicated generally by the numeral 9 to which the work WK is clamped. This fixture is freely slidable across the table top to bring the work into operative engagement with the saw and is drawn rearwardly in a feeding stroke by means of a positive force easily controlled by the operator.

Specifically, the work holding device or fixture comprises a metal ring 10 of sufficient rigidity and strength, and a plurality of clamps 11 carried thereby which grasp the work top and bottom.

It is to be appreciated that in setting up the machine for use the band saw must be threaded through the ring 10. For this purpose the saw is cut, threaded through the ring and the work mounted thereon, and then its ends are welded together.

The outer periphery of the ring 10 is grooved for the reception of a flexible endless tension member 12. The flexible endless tension member may be a steel cable or a chain of suitable design. It is looped around the front and sides of the ring and extends rearwardly to the rear edge of the table where it is trained over idler pulleys 13.

It is to be observed that the pulleys 13 are substantially equispaced from and close to a median vertical plane extended rearwardly from the work engaging portion of the saw. These pulleys guide the stretches of the tension member 12 extending rearwardly from the ring so that they extend back from the work along lines which meet at a point to the rear of the cutting face of the tool and which point lies in the aforementioned vertical median plane. Hence, an equal pull on the two stretches 14 of the flexible tension member depending from the idler pulleys results in the establishment of equal turning moments on the work at opposite sides of the saw regardless of the location of the cut with respect to the center of the ring.

The looped portion 14 depending from the idler pulleys is guided by pulleys 15, which become active primarily when the table is tilted downwardly in the front as will be clearly seen from Figure 2.

At the bottom of the depending looped portion 14 a wheel 16 is suspended. If the flexible element is a chain this wheel takes the form of a sprocket. If it is a cable the wheel is in the form of a grooved pulley. The important thing is that there be a driving relationship between the wheel and the flexible element.

Through structure to be hereinafter described and including the wheel 16 a weight WT is suspended from the flexible element to at all times impart a downward pull thereon and, thus, draw the work holding fixture rearwardly across the table top. Such rearward motion of the work holding fixture of course presses the work carried thereby against the cutting edge of the saw.

To guide the work as it is fed to the saw the entire fixture is rotated about the saw through the medium of the flexible tension member by imparting turning force in one direction or the other on the wheel 16. The manner in which this turning force is applied to the wheel will be described hereinafter, but it is desired to note here that the guiding function is effected by manipulation of a hand wheel 17 mounted at the front of the table.

As best illustrated in Figure 4 the wheel 16 is fixed to a shaft 18. This shaft is journalled in bearings carried by a bracket or gear box 19 and has a bevel gear connection with an upright shaft 20.

The bracket or gear box 19 is pivoted as at 21 to the free end of a scale beam 22, which in turn is pivoted at its opposite end (as at 23) to a fixed supporting bracket 24. The weight WT is slidably supported on the scale beam by means of a supporting head including a nut member 25. An adjusting screw 26 threaded in the nut member provides means for sliding the same along the beam 22 to adjust the leverage with which the weight WT pulls on the beam.

Adjustment of the screw 26 is effected by means of a hand wheel 27 mounted on the side of the base with its shaft 28 drivingly connected with the screw through bevel gears 29 and a universal joint 30.

The scale beam and consequently, the weight WT are thus supported jointly by the pivot 23 and the depending portion 14 of the flexible tension member. Hence, by shifting the weight along the length of the scale beam, its effective force on the tension member is adjusted to correspondingly vary the feeding pressure.

As stated hereinbefore, the work is guided by rotating the fixture about the saw through the medium of the flexible tension member in response to a turning force imparted to the wheel 16. Such force is transmitted from the hand wheel 17 through a shaft 31 mounted under the table and drivingly connected with the upright shaft 20 through a telescoping universal joint driving connection. Tilting of the table thus does not interfere with the transmission of driving force from the hand wheel 17 to the wheel 16.

In addition to manual adjustment of the leverage through which the weight acts to thereby control the feeding pressure, there is also provided a control for the rate of feed. This control comprises a dash-pot indicated generally by the numeral 32 mounted inside the base and including a piston 33 which descends in consequence to lowering of the weight WT. The rate at which the piston is permitted to descend governs the rate of the work feed.

The connection between the piston and the weight consists of a bell-crank lever 34 pivoted to a fixed support as at 35 with one arm thereof connected to the piston as at 36 and its other arm connected to the scale beam as at 37. Descent of the scale beam effected by the weight WT, thus, rocks the bell-crank lever 34 about its pivot 35 to depress the piston 33.

By means of ports properly located in the cylinder within which the piston operates, and pressure lines 38 which lead to a control valve 39 supported on a table adjacent to the hand wheel 17, the by-pass for the dash-pot is at all times under control of the operator. The control valve 39 in fact constitutes the by-pass valve. Hence, its adjustment governs the rate of piston descent and consequently the rate of work feed.

To accommodate tilting of the table, a part 38' of the pressure lines is flexible, the flexible portions being coupled to the solid portions at a coupling block 40.

Obviously, the weight propelled feeding stroke of the mechanism is limited and when this limit is reached, the weight must be re-set and the fixture pulled forwardly to prepare the work for another cut.

Restoration of the weight to its potentially operative position is effected by means of a treadle 41 pivotally mounted from the base as at 42 and connected through a chain or other flexible tension member 43 trained over an idler support 44 with the scale beam 22. Depression of the treadle thus lifts the beam and consequently the weight; and to lock the feed mechanism in its potentially operative position, a notch 45 is provided at the bottom of the slot 46 through which the treadle extends, into which the treadle may be hooked as will be readily apparent.

From the foregoing description taken in connection with the accompanying drawings, it will be readily apparent that this invention provides an exceptionally simple, highly practical work feeding mechanism for machines of the character described, and while it is preferable to employ the fixture 9 and to mount the work thereon, it will be obvious that many of the features of the invention may be utilized by looping the flexible tension member directly about the work as illustrated in Figure 5. This latter method of connecting the tension member with the work is especially feasible where the cut is to follow a substantially straight line.

From a consideration of Figure 5 it will be clear that equal turning moments are at all times maintained on the work at opposite sides of the saw which acts as a fulcrum regardless of the location of the cut with respect to the center of the ring 10 when the fixture is used and that equal turning moments are also maintained on the work when the tension member is looped directly about it as long as the point of intersection of the two forces applied through the horizontal stretches of the tension member lies in a vertical plane passing through the fulcrum at the toothed edge of the saw.

The state of equilibrium thus established in the work results from the fact that the product of the effective pull on the work applied through one stretch of the tension member times the leverage of said stretch of the tension member (perpendicular distance between said stretch of the tension member and the fulcrum provided by the edge of the saw) is always equal to the product of the effective pull applied on the work through the other stretch of the tension member times its leverage, regardless of the depth of the cut.

In some instances, where the tension member is looped directly about the work it may be preferable to train the tension member over a set of auxiliary idler pulleys 13' before carrying it over the pulleys 13. As shown in Figure 6, these auxiliary pulleys are located near the corners of the table, and they are preferably supported on vertically adjustable stems to permit them to be dropped down beneath the level of the table when not in use.

What I claim as my invention is:

1. In a machine having a work table and a tool operating in a path intersecting the table top: a work holding device freely slidable across the table top; a weight; means connecting the weight with said work holding device so that the weight tends to move the device across the table in a direction to bring work carried by the device against the tool; and mechanism operatively associated with said connecting means for imparting turning movement to the device through said connecting means to guide the work into proper engagement with the tool.

2. In a machine having a work table and a tool operating in a path intersecting the table top: a work holding device freely slidable across the table top; a weight; means connecting the weight with said work holding device so that the weight tends to move the device across the table in a direction to bring work carried by the device against the tool; and mechanism at all times drivingly connected with said connecting means so as to transmit motion thereto for imparting a turning movement to the device through the connection between the weight and the device.

3. In a machine having a work table and a tool operating in a path intersecting the table top: means for feeding work across the table top to the tool including a flexible element looped around the work; means at the edge of the table behind the tool over which said flexible element is trained so that a portion thereof depends downwardly from the table; a weight; means for suspending the weight from said depending portion of the flexible element; and manually operable mechanism having a motion transmitting connection with the flexible element and acting therethrough for swinging the work about the tool so as to guide the same for proper engagement therewith.

4. In a machine having a work table and a tool operating in a path intersecting the table top: means for feeding work across the table top to the tool including flexible tension members connected with the work and arranged to exert a pull on the work at opposite sides of the tool so that said tension members may be used to rock the work one way or the other about the tool as a fulcrum and thereby guide the cutting action; means for exerting the same pull on a portion of both tension members; and mechanism having a motion transmitting connection with said tension members for increasing the pull on one tension member while decreasing the pull on the other, and vice versa to rock the work about the tool.

5. In a machine having a work table and a tool operating in a path intersecting the table top: means for feeding work across the table top to the tool including flexible tension members connected with the work and arranged to exert a pull on the work at opposite sides of the tool so that said tension members may be used to swing the work one way or the other about the tool to guide the cutting action, said tension members each having a portion thereof extending back to the rear edge of the table behind the tool; means over which said portions of the flexible tension members are trained to depend downwardly from the rear edge of the table; a weight suspended from said depending portions of the flexible tension members so that the weight imposes a like pull on both tension members to feed the work to the tool; means for increasing the pull on one tension member while decreasing the pull on the other, and vice versa; and means for governing the descent of the weight to thereby adjust the rate of work feed.

6. In a machine of the character described: a work supporting table; a tool against which work on the table is to be fed; tension means for imparting a pull on the work at opposite sides of the tool so that unequal turning moments on the work swings the work one way or the other about the tool; means for causing equal turning moments to be applied to the work through said tension means with the tool as a fulcrum including guides for the tension means for controlling the direction of pull applied to the work at opposite sides of the tool; a manual direction control mounted to be convenient to an operator of the machine; and mechanism drivingly connected between said manual control and the tension means actuated by said control for simultaneously and inversely altering the pull on opposite sides of the work through the tension means to thereby guide the work and cause the tool to follow a given line.

7. In a machine having a work table and a tool operating in a path intersecting the table top: means for feeding work across the table to the tool including a flexible tension element connected with the work and extending beyond and over the rear edge of the table to depend therefrom; a weight; a pivoted beam upon which the weight is slidably mounted; means connecting the depending portion of the flexible tension element with said beam at the side of the weight opposite the beam pivot so that the weight acting through the flexible tension element draws the work rearwardly across the table; and means for moving the weight along the length of the beam to adjust its pull upon the flexible tension element.

8. In a machine having a work table and a tool operating in a path intersecting the table top: means for feeding work across the table to the tool including spaced flexible tension means connected with the work at opposite sides of the tool so that tension thereon resulting in unequal turning moments about the point of engagement between the work and the tool tends to swing the work about the tool, said tension means extending rearwardly over a rear edge portion of the table to depend therefrom; a wheel supported by the tension means and drivingly connected thereto; a weight connected with said wheel to impart an equal pull on said tension means; and means for turning the wheel to simultaneously inversely vary the tension applied to the work at opposite sides of the tool and thereby guide the work for proper engagement with the tool.

9. In a machine having a tiltable work table and a tool operating in a path intersecting the table top: means for feeding work across the table to the tool including spaced flexible tension means connected with the work at opposite sides of the tool so that tension thereon resulting in unequal turning moments about the point of engagement between the work and the tool tends to swing the work about the tool, said tension means extending rearwardly over a rear edge portion of the table to depend therefrom; a wheel supported by the tension means and drivingly connected thereto; a weight connected with said wheel to impart an equal pull on said tension means; and means for turning the wheel to simultaneously inversely vary the tension applied to the work at opposite sides of the tool and thereby guide the work for proper engagement with the tool, said last named means comprising a hand wheel supported from the table, and a driving transmission from the hand wheel to said wheel including a telescoping drive shaft and universal joint connections so as to allow for tilting of the table.

10. In a machine having a work table and a tool operating in a path intersecting the table top: a work holding device freely slidable across the table top, said device comprising, a ring and clamps mounted on the ring for gripping work; an endless flexible tension element looped about the ring and having spaced stretches extending substantially tangentially from the ring and rearwardly over and depending from the rear portion of the table; a wheel suspended in the loop formed by the depending portion of the flexible tension element; a weight; means for suspending the weight from said wheel so that the weight imparts an equal downward pull on both stretches of the flexible tension element to draw the work holding device rearwardly across the table; and means for turning said wheel to inversely vary the pull on the two stretches of the flexible tension member and rotate the work holding device about its own axis to guide the work into proper engagement with the tool.

11. In a machine having a work table and a tool operating in a path intersecting the table top: a work holding device freely slidable across the table top, said device comprising, a ring and clamps mounted on the ring for gripping work; an endless flexible tension element looped about the ring and having spaced stretches thereof extending rearwardly over and depending from a rear edge portion of the table; a weight suspended from said depending stretches of the flexible tension element; means for controlling the ratio of the pull imposed on the two stretches of the flexible tension element by the weight so as to guide the work for proper engagement with the tool; a foot treadle; and means connecting the treadle with the weight whereby depression of the treadle lifts the weight to enable resetting of the work holding device.

12. In a machine of the character described: means for feeding work to a tool including, a weight; a pivoted beam upon which said weight is slidably mounted; a nut connected with the weight; a screw shaft threaded in the nut, a hand wheel for turning the screw shaft; means drivingly connecting the hand wheel with the screw shaft; a foot treadle; and means for connecting the foot treadle with the pivoted beam for lifting the beam and consequently the weight upon depression of the treadle.

13. In a machine of the character described: means for feeding work to a tool including, a flexible element looped about the work and having a depending looped portion; a wheel suspended in said depending looped portion; means for imparting a downward pull on said wheel so as to maintain the same in driving engagement with the flexible element; and means for turning the wheel to rotate the work about an axis perpendicular to the plane of its feeding motion.

14. In a machine of the character described: a work table; a tool operating in a path intersecting the table top so that work on the table may be fed to the tool; means for feeding the work to the cutting face of the tool including two stretches of flexible tension members connected with the work at opposite sides of the tool; means for imparting equal pull on both stretches of tension members; and means for guiding said stretches of tension members so that they extend back from the work along lines which meet at a point to the rear of the cutting face of the tool and which lies on a vertical plane perpendicular to and substantially bisecting the cutting face of the tool so that an equal turning moment is applied to the work at opposite sides of the tool as a fulcrum.

15. In a machine having a work table and a tool operating in a path intersecting the table top: means providing a work feeding force for feeding work across the table to the tool; means for applying said force to the work on the table, including tension members connected with the work at opposite sides of the tool so that tension thereon resulting in unequal turning moments about the point of engagement between the work and the tool tends to swing the work about the tool; and means connected between said tension members and the means for providing the work feeding force and manually operable while the machine is in operation as well as when the machine is idle for varying the effect of said feeding force on the tension members and correspondingly altering the turning moments imparted to the work by the tension members to thereby guide the feeding of the work.

16. In a machine having a work table and a tool operating in a path intersecting the table top: means for feeding work across the table to the tool comprising, means providing a work feeding force; a rotatable wheel connected with the means providing the work feeding force so as to be bodily movable thereby; a tension member drivingly trained over said wheel and having its opposite stretches connected with the work at opposite sides of the tool so that tension thereon resulting in unequal turning moments about the point of engagement between the work and the tool tends to swing the work about the tool; and manually operable means for rotating said wheel and thereby inversely varying the pull applied to the work by the opposite stretches of the tension member.

JAMES W. WILKIE.